March 21, 1939.  H. R. VILLARREAL  2,151,172
OSCILLATORY WIND MOTOR
Filed April 19, 1938  3 Sheets-Sheet 1
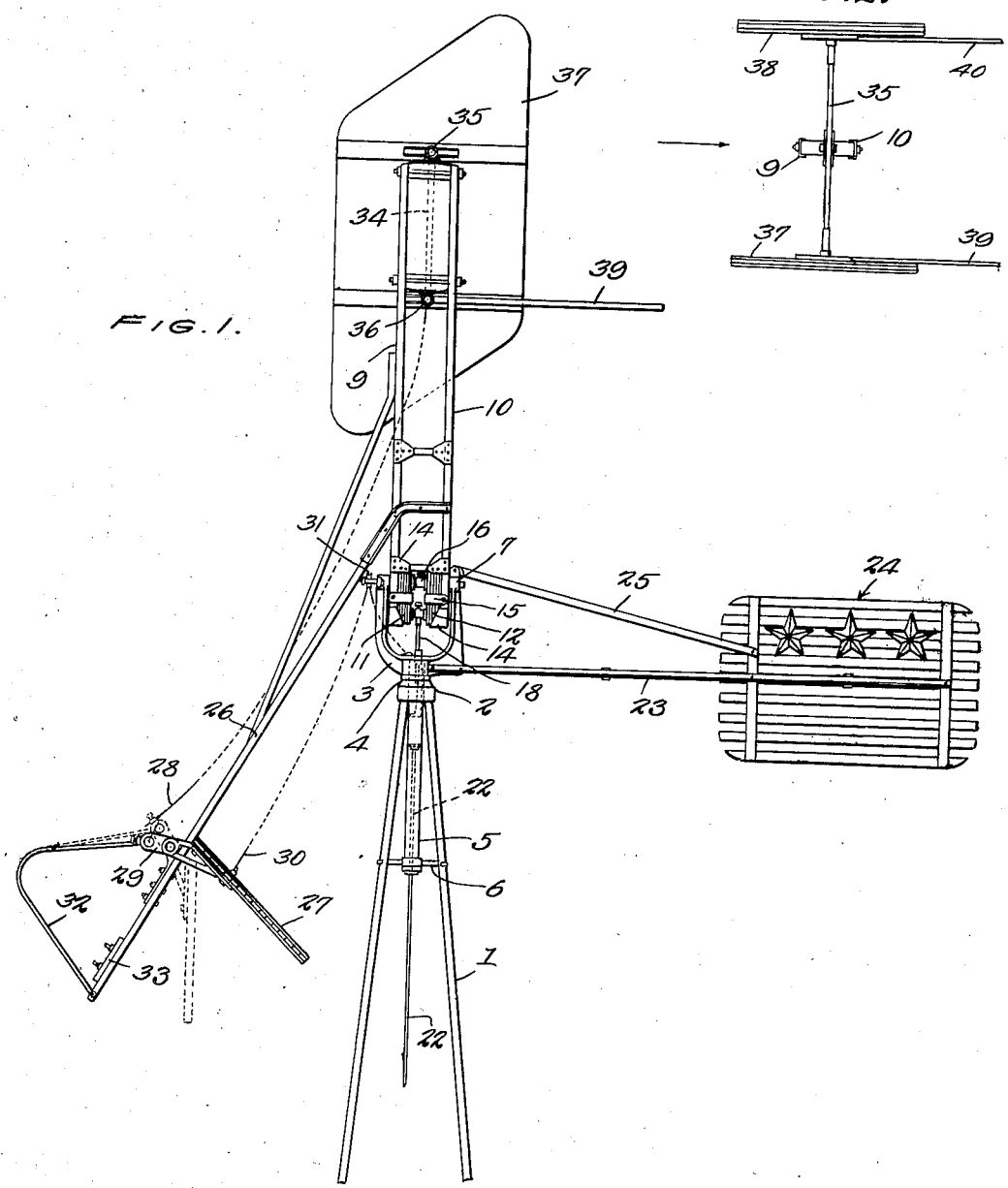
HUMBERTO RAMIREZ VILLARREAL
INVENTOR.
BY
ATTORNEYS.

March 21, 1939.  H. R. VILLARREAL  2,151,172
OSCILLATORY WIND MOTOR
Filed April 19, 1938  3 Sheets-Sheet 2
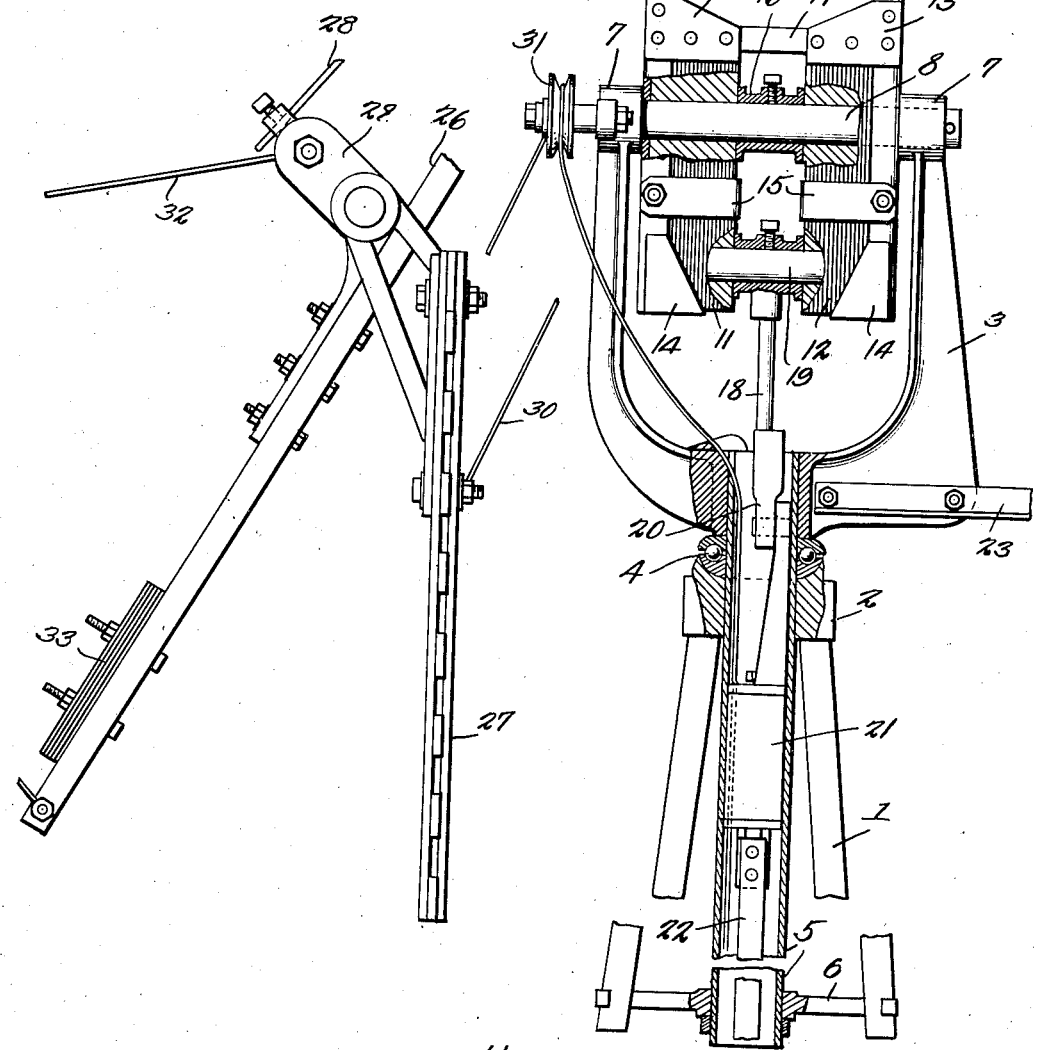

March 21, 1939.   H. R. VILLARREAL   2,151,172
OSCILLATORY WIND MOTOR
Filed April 19, 1938   3 Sheets-Sheet 3
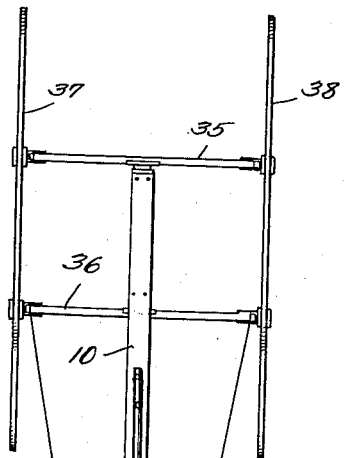
FIG. 5.
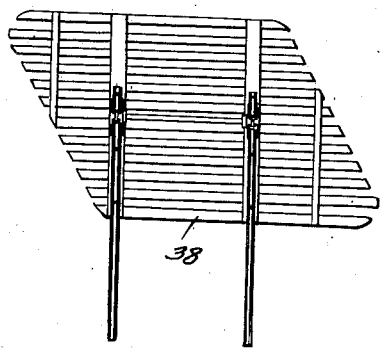
FIG. 6.
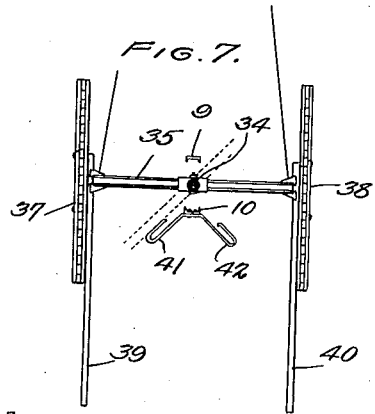
FIG. 7.
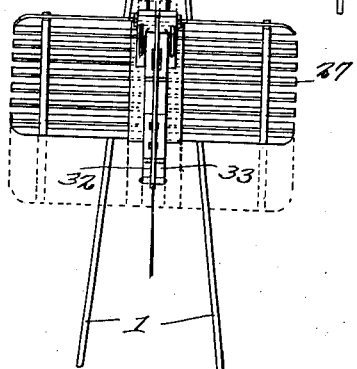
HUMBERTO RAMIREZ VILLARREAL
INVENTOR.
BY *CA Snow & Co.*
ATTORNEYS.

Patented Mar. 21, 1939

2,151,172

UNITED STATES PATENT OFFICE 2,151,172

OSCILLATORY WIND MOTOR

Humberto Ramírez Villarreal, Mexico, D. F., Mexico

Application April 19, 1938, Serial No. 202,943

3 Claims. (Cl. 170—7)

This invention relates to improvements in wind motors, and more particularly to an oscillatory motor which will be combined with a suitable support and connected to a power shaft whereby the force of the wind operating upon the shiftable surfaces of the wings will cause an oscillatory movement thereof and a reciprocating movement of the power shaft, whereby power may be taken therefrom for performing any desired work.

An object of my invention is to provide an oscillatory wind motor which will be arranged with a pair of spaced wings connected to an oscillatory shaft pivotally mounted at the top of a suitable support, together with a rudder mechanism for keeping the wings in the proper relation to the direction of the wind, and means connected with said oscillatory wings whereby power may be taken from the motor for operating any desired mechanism.

A further object of my invention is to provide an improved oscillatory wind motor which will consist of a pair of spaced shiftable wing surfaces supported upon the oscillatory motor shaft, the same being connected with a power shaft from which power may be taken, and an associated protecting means for reducing the angle of attack of the wings in case of hurricanes or high wind, thereby permitting the wind motor to operate in relatively high winds which would necessitate the stopping of other types of windmills.

A still further object of my invention is to provide a wind motor of the oscillatory type which will be highly efficient in operation, and relatively inexpensive to manufacture.

Other objects will appear as the description proceeds.

In the accompanying drawings which form a part of my application,

Figure 1 is a side elevation of my improved oscillatory wind motor;

Figure 2 is a top plan view of the spaced wings of my improved oscillatory motor;

Figure 3 is a side elevation partly in section of my improved motor mechanism showing the connection between the oscillatory motor shaft and the reciprocating power shaft;

Figure 4 is a detail side elevation of the protector mechanism used for permitting operation of the wind motor in times of extremely high winds;

Figure 5 is an end view of my improved oscillatory wind motor showing the relative positioning of the wind collecting wings and the protector and rudder surfaces;

Figure 6 is a detail view of one of the wind collecting wings; and

Figure 7 is a detail view of the wind collecting wings arranged at right angles to the position as shown in Figure 6.

Like characters of reference are used throughout the following specification and the accompanying drawings to designate corresponding parts.

In carrying out my invention, I provide a suitable supporting frame or tripod 1 which will be firmly secured to the ground and will extend up a sufficient distance above the ground whereby the wind motor will be in position to be acted upon by the force of the prevailing winds. Positioned at the upper end of the tower or frame 1, is a head 2 which is provided with a yoke motor support 3 mounted upon the ball bearing race 4 for rotating movement, and connected with the hollow mask pipe or casing 5 which extends a considerable distance below the head and is supported at its lower end by the bracing members 6. Mounted across the upper end of the yoke 3 in the base bearing 7 is provided a transverse pivot shaft 8, which in turn supports the lower end of the motor arm. The motor arm comprises a pair of upwardly extending spaced rods 9 and 10 to which are connected at their lower ends, the hardwood bearing blocks 11 and 12 by means of the brackets 13 and 14 and the clamp 15. A spacing ferrule 16 is mounted upon the shaft 8 to properly space the bearing blocks 11 and 12 from each other, and a connection 17 is made between the upper ends of the said bearings to connect the brackets 13. A connecting rod 18 is mounted upon the connecting rod shaft 19 positioned between the lower ends of bearing blocks 11 and 12, and extends into the upper end of the mask casings 5, and is pivotally connected at 20 to the upper end of the piston guide member 21 which is mounted for reciprocating movement within said casing 5. The lower end of the piston 21 is connected to a power shaft or rod 22, which extends down to a point adjacent the ground, and from which power may be taken for driving any desired mechanism.

Supported upon the lower portion of the yoke 3 and extending laterally therefrom is the rudder arm 23, which supports the rudder 24 at its outer end, said rudder being braced by the brace rod 25 which is connected between the said rudder and the upper portion of the said yoke. I have illustrated the rudder as being formed of a plurality of lattice strips, but the same may be made from a sheet of material or in any other desired manner.

As seen in Figure 1, a bracket arm 26 is secured to and turns downwardly from the motor arms 9 and 10, and pivoted to the lower end of this bracket 26 is a surface or vane 27 which is connected with the main wings mounted at the upper ends of the said rods 9 and 10, and is normal or nearly normal to the wind when the wind is moderate and has not force enough to push it back against the tension of the spring 32. The vane 27 is arranged facing the direction of the wind and is provided above its hinge with a heavy arm 29. Cables 28 are connected between the arm 29 and the wings on the end of the motor rods 9 and 10. A pull-out cable 30 is connected to the rear side of the hurricane protector 27 below the pivot of the latter and passes over the pulley 31 on the main frame and downward through the mask pipe and swivel device to the reefing gear (not shown). The hurricane protector or vane 27 is held in its normal position by means of the spring 32 secured to the arm 29 and to the end of the said bracket arm 26. An adjustable weight 33 is also secured adjacent the end of the bracket arm 26 and serves to adjust the balance of the said arm and parts associated therewith. Mounted between the upper ends of the arms 9 and 10 is a biplane or multiplane pivot shaft 34 journaled between the said arms and extending longitudinally of the same. Struts 35 and 36 are fixed on the shaft 34. A pair of wings 37 and 38 are secured to the outer ends of the struts 35 and 36 and extend substantially parallel to each other. The fact that the cables 28 are of equal length and are brought into tension when the vane 27 is blown backwards as illustrated in Figure 1 of the drawings, holds the two ends of the strut 35 equal distance from their point of attachment of the cables on the arm 29 resulting in the holding of the wings 37 and 38 parallel with the wind. I have illustrated the wings 37 and 38 as being latticed, but it will be apparent that any form of wing may be employed, as for example a solid sheet of material. The weighted rods 39 and 40 will be supported by the lower struts 36, and will extend outwardly from the wings 37 and 38, and serve to turn the wings on their pivot against wind pressure after the motor arm has reached either end of its travel, due to the fact that when the wings are at their lateral limit, the weighted rods 39 and 40 will be above the pivotal points of said wings and due to the action of gravity the weights will drop downwardly thereby turning the reverse faces of the wings to the wind whereupon the wings will swing back towards the opposite side.

If desired, suitable springs 41 and 42 may be employed as elastic stops in case of rupture of the cables 28.

The pull-out line or cable 30 may be connected to the plunger rod in order to bring this rod down in the pull-out operation, when the plunger rod happens to be in an upper position (up from the low limit of the stroke). Bringing the plunger rod down raises the motor arm to a vertical position where it is maintained by the pull-out device which at the same time puts the wing or wings in a neutral position giving little or no angle of attack to the wind.

The force of the wind keeps the wings in the attack position. If the wind is weak the attack reversing action takes place shortly after the motor arm has departed from the vertical in its swinging motion, for the wind pressure opposes the eccentric heaviness of the wing or set of wings, and has no force to maintain the same attack long after the motor arm reaches the middle or vertical position. This can be done when the wind grows stronger. Due to this arrangement the machine automatically takes a shorter and lighter stroke, swinging in a shorter central space when the wind is weak, and takes a longer stroke or heavier stroke when the wind grows stronger. This permits the machine to function within a wider range of wind speed than is ordinarily possible with other types of windmills or wind motors.

From the foregoing description it will be apparent that the rudder will turn the wings in the proper direction to receive any air that is moving, and the air striking upon the wings will operate the motor arms laterally, the said wings shifting angularly on pivot shaft 34 at the end of each oscillation so that the wind will cause the same to oscillate in opposite direction backward. It will be understood that there is a fairly close balance between the wings and the hurricane protector and the various parts of the moving mechanism of the motor, and since the bearings for the motor arm are of hardwood, no lubrication will be necessary or required, and the life of the motor will be quite long.

It will be understood that I do not intend to limit myself to the specific construction set forth in the specification and the accompanying drawings, as many minor changes in detail of construction may be resorted to without departure from the spirit of the invention.

Having thus described my invention what I claim as new and desire to secure by Letters Patent of the United States is:

1. In an oscillatory wind motor, a supporting frame, a yoke swivelly mounted thereon, a pivoted arm on said yoke, parallel wings pivoted at the outer end of said arm, power take-off means connected with the inner end of said arm, and counterbalance weights on said wings below their pivotal point whereby the wings will be turned into the wind at the end of each oscillatory movement.

2. In an oscillatory wind motor, a supporting frame, a yoke swivelly mounted thereon, a pivoted arm on said yoke, parallel wings pivoted at the outer end of said arm, power take-off means connected with the inner end of said arm, counterbalance weights on said wings below their pivotal point whereby the wings will be turned into the wind at the end of each oscillatory movement, and a balancing and braking mechanism supported by said pivoted arm.

3. In an oscillatory wind motor, a supporting frame, a yoke swivelly mounted thereon, pivoted arms supported in said yoke, parallel extending wings pivotally supported at the free ends of said arms and provided with laterally extending counterweights positioned below the pivotal point of the wings, power take-off means connected with the opposite end of said pivoted arms, a laterally extending arm supported by said arms pivoted in said yoke and extending below said pivotal point and a spring tensioned braking vane supported at the lower end of said last mentioned arm.

HUMBERTO RAMÍREZ VILLARREAL.